United States Patent [19]
Lin

[11] Patent Number: 5,727,588
[45] Date of Patent: Mar. 17, 1998

[54] DEPRESSURIZING CONNECTOR

[76] Inventor: Arther Lin, No.1, Lane 148, Bi-Hwa Street, San-Chung City, Taipei Hsien, Taiwan

[21] Appl. No.: 617,377

[22] Filed: Mar. 18, 1996

[51] Int. Cl.⁶ .................................................. F16K 37/00
[52] U.S. Cl. ................ 137/116.5; 137/557; 137/505.37; 137/505.33
[58] Field of Search ................ 137/116.5, 557, 137/505.37, 505.33

[56] References Cited

U.S. PATENT DOCUMENTS

| | | | |
|---|---|---|---|
| 1,595,809 | 10/1926 | Nichols | 137/116.5 |
| 2,047,101 | 7/1936 | Grove | 137/505.37 |
| 2,150,460 | 3/1939 | Riches | 137/116.5 |
| 2,195,242 | 3/1940 | Dow | 137/505.37 |
| 2,237,940 | 4/1941 | Koenig | 137/116.5 |
| 2,706,995 | 4/1955 | May | 137/505.33 |
| 3,240,223 | 3/1966 | Horst | 137/116.5 |
| 3,545,471 | 12/1970 | Taplin | 137/505.37 |
| 4,732,077 | 3/1988 | Schweikert | 137/116.5 |

Primary Examiner—Denise L. Ferensic
Assistant Examiner—Joanne Y. Kim
Attorney, Agent, or Firm—Bacon & Thomas

[57] ABSTRACT

A depressurizing connector includes a body which has an interior chamber formed therein, an inlet in fluid communication with the interior chamber for connecting to an external pressurized air source to supply pressurized air at a first pressure to the interior chamber, a first outlet in fluid communication with the interior chamber to output the first pressure, a depressurizing device incorporated within the connector body to be operable to change the first pressure to a second pressure lower than the first pressure in an adjustable manner, a second outlet in fluid communication with the bore to output the second pressure and a pressure gauge to indicate the second pressure.

2 Claims, 6 Drawing Sheets

DEPRESSURIZING CONNECTOR

FIELD OF THE INVENTION

The present invention relates generally to a pneumatic connector and in particular to a depressurizing connector which provides both a regular high pressure outlet and a reduced pressure outlet with a pressure gauge incorporated therein to indicate the reduced pressure.

BACKGROUND OF THE INVENTION

Pneumatic connectors that are used to connect a pneumatic device to a pressurized air source are known. Depressurizers which are connected to a pneumatic loop to lower down the pneumatic pressure in the loop are also known. However, it is sometimes required to use two different pressures in the same pneumatic loop. It is therefore desirable to provide a pneumatic connector that is capable of providing a regular high pressure output and a reduced pressure output by using a depresssurizer mechanism.

SUMMARY OF THE INVENTION

The main object of the present invention is to provide a pneumatic connector having two different pressure outputs with a common pressure input.

Another object of the present invention is to provide a pneumatic connector which has a pressure gauge to indicate the reduced pressure output.

To achieve the above objects, there is provided a depressurizing connector which comprises a body having an interior chamber formed therein, an inlet in fluid communication with the interior chamber and adapted to connect to an external pressurized air source to supply pressurized air at a first pressure to the interior chamber, a first outlet in fluid communication with the interior chamber to output the first pressure, a depressurizing device incorporated within the connector body to be operable to change the first pressure to a second pressure lower than the first pressure in an adjustable manner, a second outlet in fluid communication with the interior chamber to output the second pressure and a pressure gauge to indicate the second pressure.

DESCRIPTION OF THE DRAWINGS

The present invention will be further understood by the following detailed description of a preferred embodiment thereof with reference to the attached drawings, in which.

DETAILED DESCRIPTION OF THE PREFERRED EMBODIMENT

Figure 1:
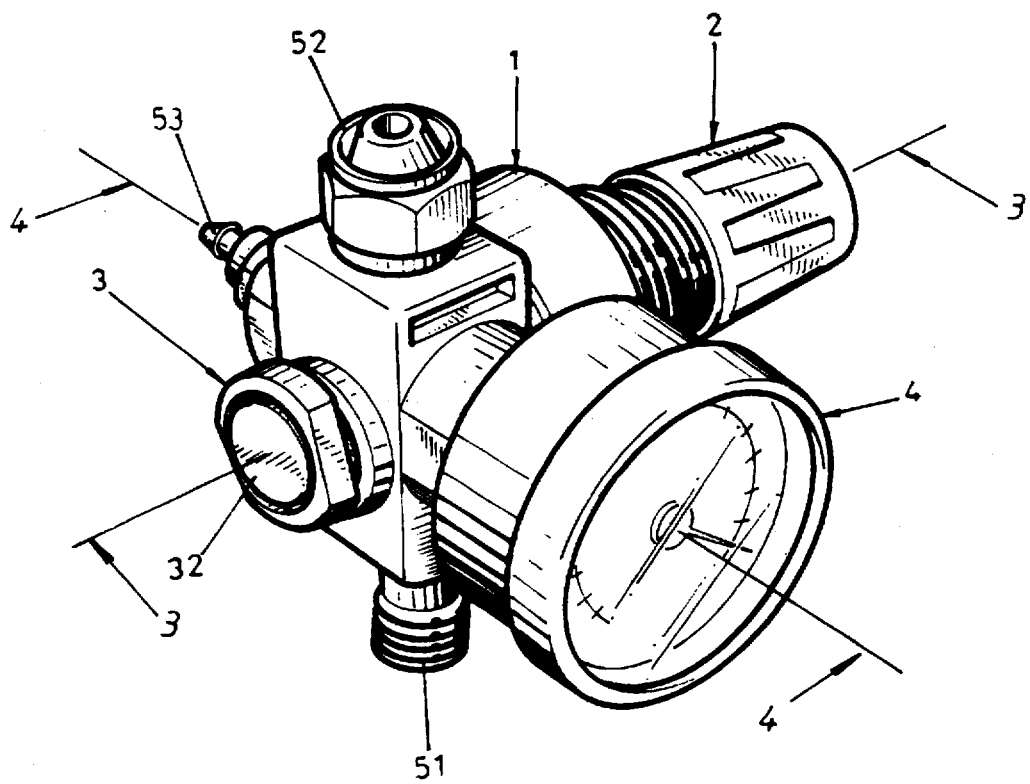
FIG. 1 is a perspective view showing a depressurizing connector constructed in accordance with the present invention.

With reference to the drawings and in particular to FIG. 1, wherein a depressurizing connector constructed in accordance with the present invention is shown, the depressurizing connector of the present invention comprises a body 1 having an inlet fitting 51 for connection with an external pressurized air source (not shown), a high pressure outlet fitting 52 adapted to engage a pneumatic device (not shown) which takes the high pressure supplied from the external pressurized air source, a reduced pressure outlet fitting 53 adapted to engage another pneumatic device (not shown) which requires a reduced air pressure in operation, a regulator 2 and a flow control 3 are mounted. The regulator 2 is provided to control and adjust the output pressure supplied via the reduced pressure outlet fitting 53.

Figure 2:
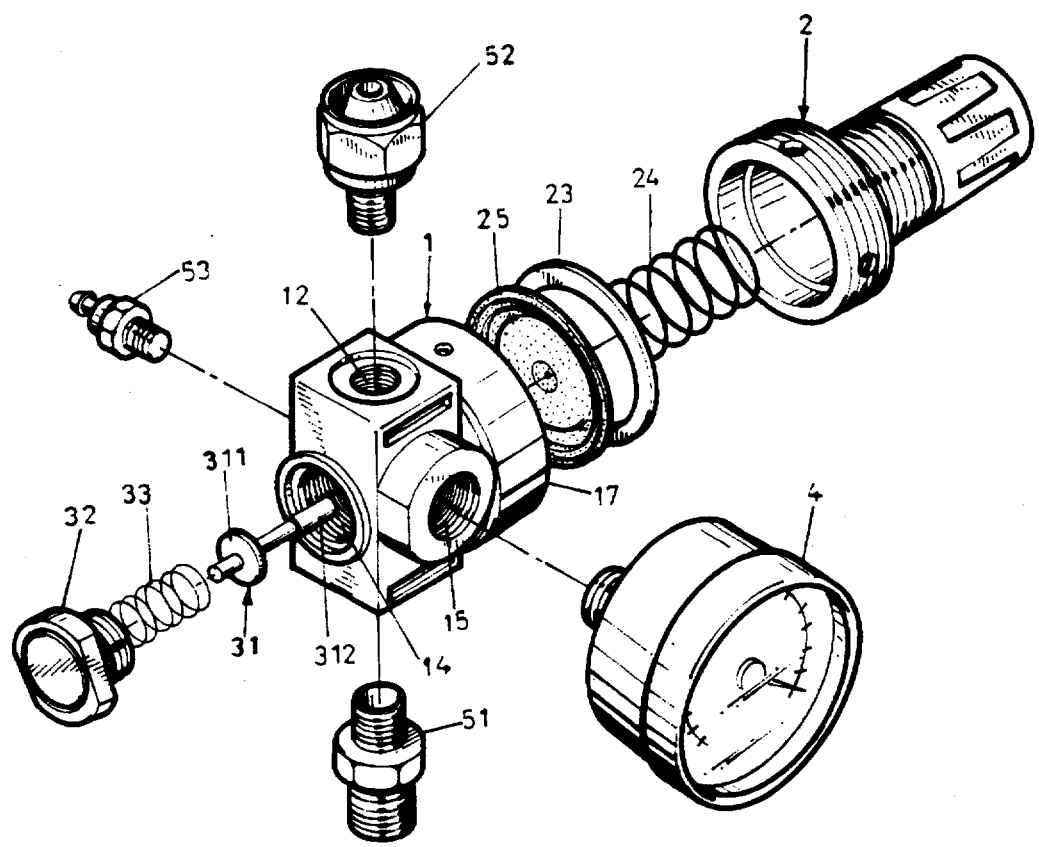
FIG. 2 is an exploded perspective view of the depressurizing connector of the present invention.
Figure 3:
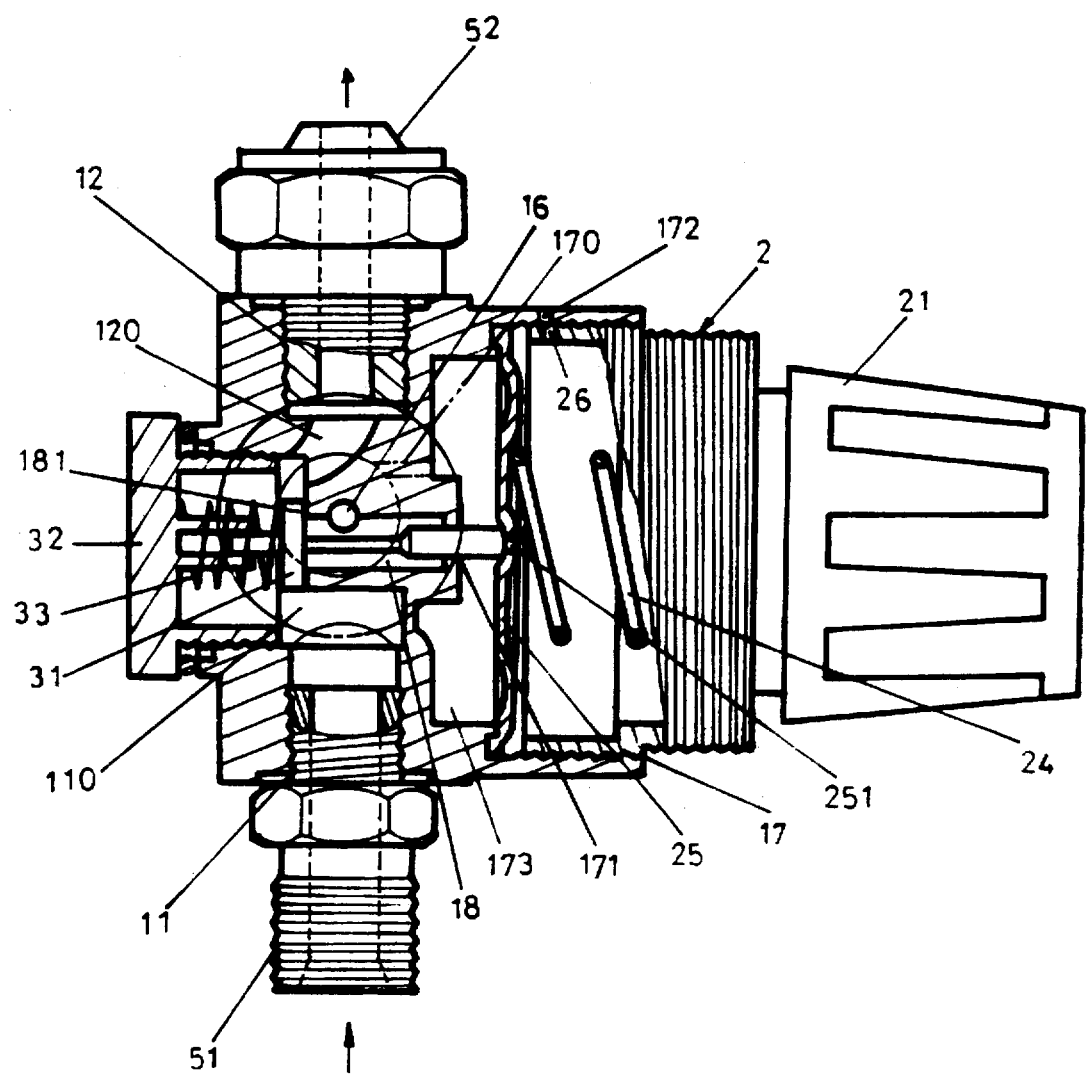
FIG. 3 is a cross-sectional view of the depressurizing connector of the present invention.
Figure 4:
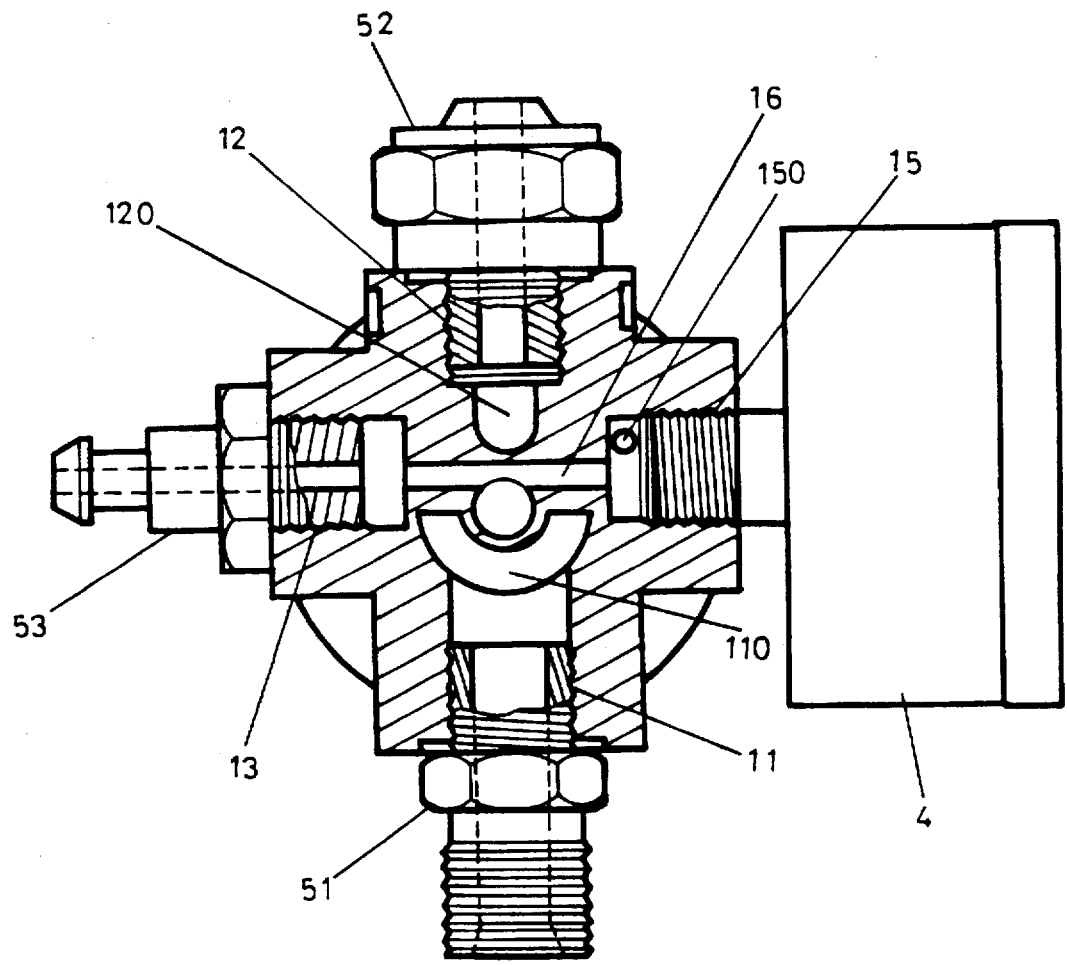
FIG. 4 is a cross-sectional view of the depressurizing connector of the present invention taken along a different section of the connector.

Further referring to FIGS. 2-4, the connector body 1 has an inlet 11 and a high pressure outlet 12 formed thereon to which the inlet fitting 51 and the high pressure outlet fitting 52 are respectively mounted, preferably by means of threading, as showing in FIG. 2. The connector body 1 has an inlet passage 110 and a high pressure outlet passage 120 formed therein to respective extend from the inlet 11 and the high pressure outlet 12 and connect to each other at an interior chamber (see FIGS. 2 and 3) of the connector body 1 so as to allow the input pressure from the external pressurized air source via the inlet fitting 51 to supply to the pneumatic device (not shown) which is connected to the high pressure outlet 12 through the high pressure outlet fitting 52 without depressurization.

The connector body 1 further has a first bore or recess 14 defining the inferior chamber and a second bore or recess 17 formed thereon to respectively receive and secure therein the flow control 3 and the regulator 2. The flow control 3 comprises a plug member 32 which securely fits into and thus seal the first bore 14 to define the interior chamber into which the inlet passage 110 and the high pressure outlet passage 120 extend. Preferably, the plug member 32 comprises a threaded section to threadingly engage an inner threading of the first bore 14.

The regulator 2 comprises a knob 21 which is adjustably received within the second bore 17. Preferably, the knob 21 has a threaded section threadingly engaging an inner threading of the second bore 17 so as to be rotatable and its axial location is adjustable or movable relative to the second bore 17. The regulator 2 also comprises a pressure regulating membrane 25 fixed within in the second bore 17 by means of a retainer ring 23. A spring 24 is disposed between the knob 21 and the membrane 25 to deflect the membrane 25 by means of the spring force thereof so that by adjusting the axial location of the knob 21 relative to the second bore 17, the deflection of the membrane 25 is changeable.

The membrane 25 is so located within the second bore 17 so as to define a depressurizing chamber 173 with the bottom of the second bore 17.

A third bore 18, preferably with a diameter substantially smaller than the first and second bores 14 and 17, extends between the first bore 14 and the second bore 17 to define an opening 181 or 171 with each of the first and second bores 14 and 17. A plunger 31 that is movably received within the third bore 18 has a first end extending into the first bore 14 through the opening 181 and a second end extending into the depressurizing chamber 173 through the opening 171 to be in contact engagement with the membrane 25. The membrane 25 has an aperture 251, preferably formed within a substantially centrally located cavity into which the second end of the plunger 31 is seated so as to block the aperture 251. The aperture 251 allows fluid communication between the depressurizing chamber 173 and the second bore 17.

A lid 311 is fixed on the first end of the plunger 31 for closing the opening 181 and thus cutting off the fluid communication between the first bore 14 and the third bore 18 when the plunger 31 is moved toward the second bore 17. A spring 33 is disposed in the first bore 14 and arranged between the plug member 32 and the lid 311 so as to bias the lid 311 to close the opening 181 between the first bore 14 and the third bore 18.

Preferably, the plunger 31 has an extension provided on the lid 311 and extending toward the plug member 32 and the plug member 32 has a projection extending toward the lid 311 for securely holding the spring 33.

With such a plunger 31 and the membrane 25, by moving the knob 21 inward relative to the second bore 17, the spring 24 is deflected and in turn applies a force on the membrane 25 against the biasing spring 33, thus moving the plunger 31 and the lid 311 toward the plug member 32 to open the opening 181 and establish fluid communication between the first bore 14 and the third bore 18. This allows the air pressure within the first bore 14 which is supplied from the inlet 11 through the inlet air passage 110 to the first bore 14 to get into the third bore 18.

The size of the opening 181 is adjustable through the movement of the lid 311 relative to the opening 181 and the size of the opening 181 determines the flow rate of pressurized air into the third bore 18.

The pressurized air that gets into the third bore 18 further flows into the depressurizing chamber 173 through the opening 171 and/or an air passage 170 which is connected to the third bore 18 via a channel 16. The membrane 25 is designed with such a surface area that when the depressurizing chamber 173 is filled with the pressurized air, the membrane 25 is forced by the pressurized air to move against the spring 24 and thus separating from the second end of the plunger 31 so as to open the aperture 251 to allow the pressurized air to flow into the second bore 17. A pressure release hole 26 that is provided on the regulator 2 and a corresponding hole 172 that is provided on the connector body 1 and generally in alignment with the pressure release hole 26 serve to release the air pressure within the second bore 17 when the aperture 251 is opened. This depressurizes the air inside the third bore 18 and the depressurizing chamber 173 until the air pressure therein is lowered down to a predetermined level at which the pressure is not sufficient to support the membrane 25 against the spring 24 and the spring 24 forces the membrane 25 back into contact engagement with the plunger 31 so as to close the aperture 251. With such an arrangement, the pressure inside the third bore 18 is maintained at a desired level determined by the location of the knob 21 relative to the connector body 1 or by the deflection of the spring 24.

The connector body 1 further has an inner threaded hole 15 into which the pressure gauge 4 is connected. The inner threaded hole 15 is connected to third bore 18 via the channel 16 and an air passage 150 connecting between the channel 16 and the inner threaded hole 15 to supply the reduced pressure to the pressure gauge 4.

A reduced pressure outlet 13, to which a fitting 53 is mounted, is provided on the connector body 1 and in fluid communication with the third bore 18 via channel 16 for supplying the reduced air pressure present within the third bore 18 and determined by the deflection of the spring 24 to a pneumatic device (not shown) which is connected to the fitting 53.

Figure 5:
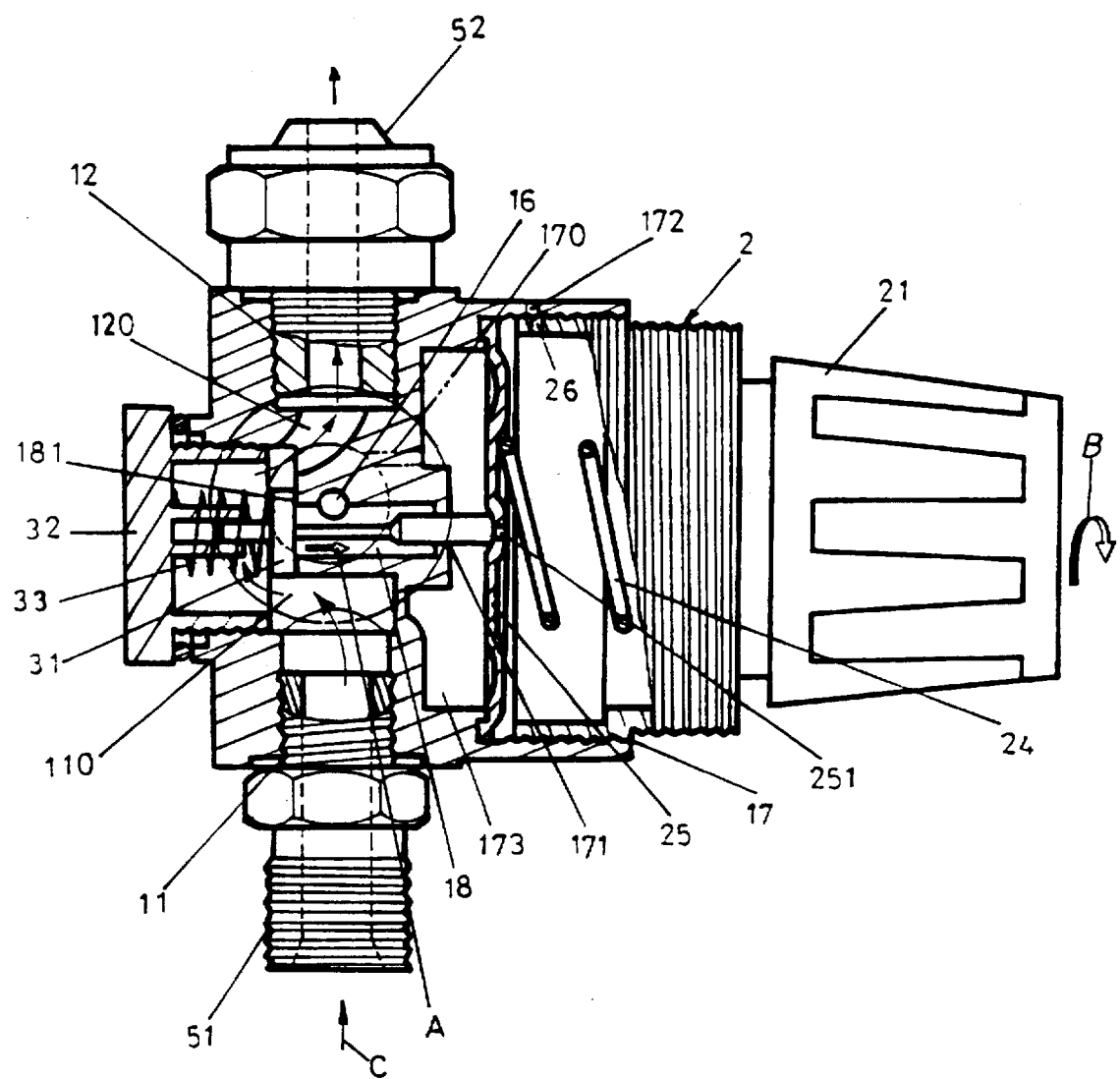
FIG. 5 is a cross-sectional view showing the depressurizing connector of the present invention in the regular high pressure output condition.

In FIG. 5, the depressurizing connector in accordance with the present invention is set to the high pressure output condition in which the plunger 31 is moved toward the second bore 17 (as indicated by arrow A) by turning the knob 21 in a first rotating direction (arrow B) to have the opening 181 between the first bore 14 and the third bore 18 closed by the lid 311. Under this situation, the pressurized air that enters the depressurizing connector of the present invention through the inlet fitting 51 is only allowed to flow to the high pressure outlet fitting 52 through the inlet passage 110, the first bore (the interior chamber) 14 and the high pressure outlet passage 120, as indicated by a series of arrows C.

Figure 6:
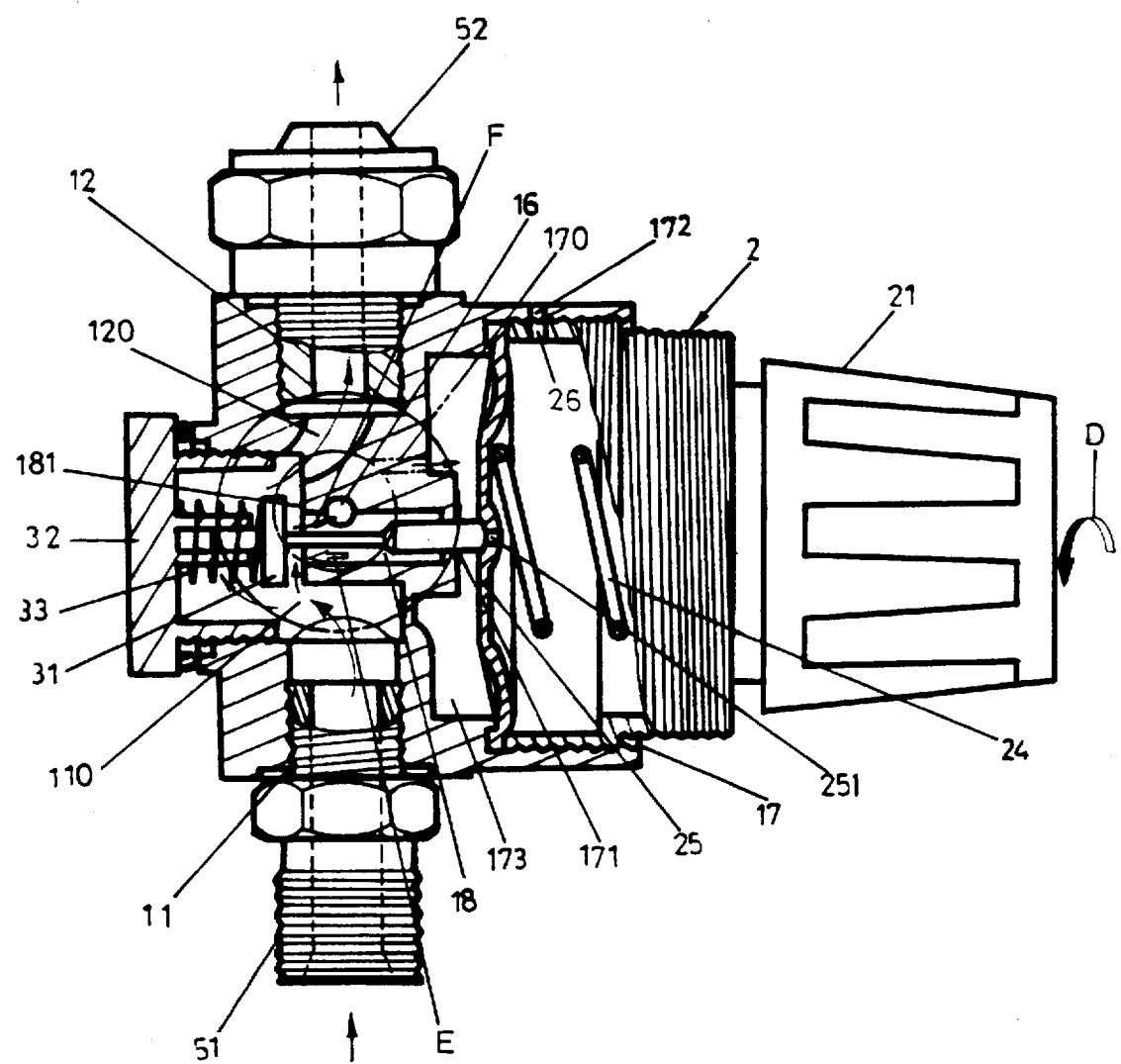
FIG. 6 is a cross-sectional view showing the depressurizing connector of the present invention in the reduced pressure output condition.

In FIG. 6, the knob 21 is rotated in a reverse direction, arrow D, to set the depressurizing connector of the present invention to the reduced pressure output condition in which the plunger 31 is moved toward to the first bore 14 (as indicated by arrow E) to open the opening 181 between the first bore 14 and the third bore 18. Under this situation, the pressurized air that enters the first bore 14 of the depressurizing connector through the inlet fitting 51 and the inlet passage 110 is allowed to flow into both the outlet passage 120 and the third bore 18, as indicated by a series of arrows F. The air that flows to the high pressure outlet 12 through the outlet passage 120 maintains at the pressure level substantially the same as that enters the connector body 1 through the inlet 11, while that flowing into the third bore 18 is subject to depressurization by means of the depressurization mechanism provided by the regulator 2.

The reduced pressure inside the third bore 18 is supplied to the reduced pressure outlet fitting 53 and is monitored by the pressure gauge 4.

As those skilled in the art may realize, there are variations and modifications that can be made on the preferred embodiment of the present invention described above without departing the spirit and scope of the present invention which is intended to be defined only by the appended claims.

What is claimed is:

1. A depressurizing connector comprising:

a) a body having an interior chamber formed therein;

b) an inlet in fluid communication with the interior chamber for connection to an external pressurized air source to supply pressurized air at a first pressure to the interior chamber;

c) a first outlet in fluid communication with the interior chamber for outputting the first pressure;

d) depressurizing means for lowering the first pressure to a second pressure;

e) a second outlet in fluid communication with the interior chamber for outputting the second pressure;

f) the depressurizing means including a recess provided in the connector body, a regulator having a manual knob adjustably received within the recess and movable relative to the connector body, a member fixed within the recess and defining an outer space and an inner space therein, an aperture formed in the membrane for providing fluid communication between the inner space and the outer space, a first spring disposed in the outer space between the membrane and the knob for applying spring force to the membrane when the knob is moved in a first direction toward the membrane for deflecting the membrane, a release hole provided in the regulator for permitting fluid communication between the outer space and an exterior atmosphere, a bore extending between the interior chamber and the inner space of the recess, the bore defining a first opening with the interior chamber and a second opening with the inner space, a plunger movably received within the bore and having a first end extending into the interior chamber through the first opening and a second end extending into the inner space through the second opening in contact engagement with the membrane to close the aperture formed therein, a lid fixed to the first end of the plunger and being movable with the plunger to close the first opening, and a second spring disposed in the interior chamber to bias the lid to close the first opening; and g) wherein when the knob is moved in the first direction to deflect the membrane, the plunger is moved towards the interior chamber and the lid opens the first opening to permit pressurized air from the air source at the first pressure to flow from the interior chamber into the bore and the inner space, thereby deflecting the membrane in a direction against the first spring to open the aperture in the membrane and permit the air at the first pressure to be released through the aperture into the outer space and through the release hole to lower the first pressure to the second pressure.

2. The depressurizing connector of claim 1, further including a pressure gauge mounted on the connector body and disposed in fluid communication with the bore for indicating the second pressure.

* * * * *